United States Patent

Lan et al.

[11] Patent Number: 6,076,732
[45] Date of Patent: *Jun. 20, 2000

[54] TWO-MOTOR REFLECTION SYSTEM WITH HOLOGRAM

[75] Inventors: Yuan-Liang Lan, Hsinchu Hsien; Chu-Wen Chen, Hsinchu; Yi-Yung Wu, Taichung, all of Taiwan

[73] Assignee: Industrial Technology Research Institute, Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/890,362

[22] Filed: Jul. 9, 1997

[30] Foreign Application Priority Data

Apr. 2, 1997 [TW] Taiwan ................. 86104244

[51] Int. Cl.$^7$ .................................... G06K 7/10
[52] U.S. Cl. ............... 235/457; 235/467; 235/472.01; 235/385; 359/15; 359/1; 359/17; 359/201
[58] Field of Search .................... 235/467, 470, 235/462.01, 472.01, 385; 359/15–17, 201, 567

[56] References Cited

U.S. PATENT DOCUMENTS

| | | | |
|---|---|---|---|
| 3,675,990 | 7/1972 | Kogelnik et al. | 350/311 |
| 4,669,811 | 6/1987 | McQuoid | 350/3.7 |
| 4,765,724 | 8/1988 | Huichun | 350/162.18 |
| 4,871,904 | 10/1989 | Metlitsky et al. | 235/467 |
| 5,157,687 | 10/1992 | Tymes | 375/1 |
| 5,187,612 | 2/1993 | Plesko | 359/896 |
| 5,272,325 | 12/1993 | Peng | 235/467 |
| 5,371,347 | 12/1994 | Plesko | 235/467 |
| 5,422,471 | 6/1995 | Plesko | 235/467 |
| 5,526,167 | 6/1996 | Peng | 359/209 |
| 5,530,565 | 6/1996 | Owen | 359/15 |
| 5,596,442 | 1/1997 | Plesko | 359/199 |
| 5,600,120 | 2/1997 | Peng | 235/467 |
| 5,668,362 | 9/1997 | Plesko | 235/467 |
| 5,691,834 | 11/1997 | Plesko | 359/202 |

FOREIGN PATENT DOCUMENTS 412544  2/1991  European Pat. Off. .

Primary Examiner—Donald Hajec
Assistant Examiner—Daniel S. Felten
Attorney, Agent, or Firm—Finnegan, Henderson, Farabow, Garrett & Dunner, L.L.P.

[57] ABSTRACT

A holographic spectroscope for a two-motor reflection system for generating scanning patterns in which a light beam is first reflected by a first reflector connected to a first motor electrically connected to a first control circuit. A second reflector for reflecting the light beam reflected by the first reflector is connected to a second motor electrically connected to a second control circuit and to form scanning patterns. A holographic spectroscope for diffracting the scanning patterns is mounted in the optical path of the light beam from the second reflector. Therefore, the scanning patterns can be improved to be more variable.

14 Claims, 3 Drawing Sheets

TWO-MOTOR REFLECTION SYSTEM WITH HOLOGRAM

BACKGROUND OF THE INVENTION

1. Field of the Invention

The invention relates to holographic spectroscopes, and, more particularly, to a holographic spectroscope which can be used with a two-motor reflection system such that the variety and the extensivity of the scanning patterns formed by the two-motor reflection system are improved.

2. Description of the Related Art

It is well-known that two-motor reflection systems are used in bar-code reading machines. U.S. Pat. No. 515,181 and European Patent No. 412,544 exemplify systems of this type. The two-motor reflection system includes two reflectors and two motors. Each reflector is connected to a motor which drives the reflector in the manner of a swash plate. Each motor is electrically connected to a control circuit operative to control the rotating speed of the motor. A light beam from a light source, such as a laser, is reflected first by one reflector and is then reflected by the other reflector. A scanning pattern formed by the two rotating reflectors is then projected onto a screen. The scanning pattern formed by the two-motor reflection system is similar to that of a lissajous curve or figure. If the rotating speed of the motor(s) is changed, or the angle of the reflector is changed, the scanning patterns also change. However, the variety of the scanning patterns effected by changes of the motor rotating speed or by changes in the angles of the reflectors is so limited that the varying scanning patterns differ from each other very little.

FIG. 1 is a schematic diagram of a conventional two-motor reflection system for projecting scanning patterns onto a screen. As shown, this two-motor reflection system includes a light source 10, such as an electric light bulb or a laser, for generating a light beam. A first rotatable reflector 11a is mounted in the optical path of the light beam from the light source 10 for reflecting that light beam. The first motor 12a rotatably drives the first reflector 11a in swash plate fashion and is electrically connected to a first control circuit 13a for controlling the rotating speed of the first motor 12a. A second reflector 11b is mounted in the optical path of the light beam from the first reflector 11a for reflecting that light beam onto a screen 16. The second motor 12b rotates a second reflector 11b and is electrically connected to a second control circuit 13b for controlling the rotating speed of the second motor 12b. In short, the two-motor reflection system includes principally the first reflector 11a, the first motor 12a, the second reflector 11b and the second motor 12b. It can generate different kinds of scanning patterns 15 by changing the rotating speed of the first motor 12a, or the second motor 12b, or by changing the angle of the first reflector 11a or the second reflector 11b. The scanning patterns 15 formed by the two-motor reflection system are then projected onto the screen 16.

The two-motor reflection system also can be used for entertainment at parties or in dance halls, alone or in combination with music or other rhythmic sounds. For example, the scanning patterns 15 formed by the two-motor reflection system may be changed by changing the rotating speed of the motor by or in synchronism with sound. If the sound is loud enough, for example, amplified music and clapping aloud, it can affect the rotating speed of the motor and make the scanning patterns 15 formed by the two-motor reflection system be more changeable and variable. However, a drawback of this system is that the changes of scanning patterns 15 formed by the two-motor reflection system tend to be largely repetition patterns. Another drawback to this two-motor reflection system is that the scanning patterns 15 are projected to a fixed location instead of to many different places and the extensivity of the scanning patterns 15 is poor. Therefore, the scanning patterns 15 are so similar and drab that they do not fulfill visual enjoyment by observers.

SUMMARY OF THE INVENTION

It is, therefore, a primary object of the invention to provide a holographic spectroscope in a two-motor reflection system for diffracting scanning patterns formed by the two-motor reflection system into many diffraction patterns so as to improve the extensivity and the variety of the scanning patterns. The holographic spectroscope includes at least one hologram which includes diffraction gratings.

It is another object of the present invention to provide a balance apparatus which is mounted in the two-motor reflection system for changing the inclination angle of the reflectors of the two-motor reflection system by changing the rotating speed of the motor.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the objects and advantages, and in accordance with the purpose of the invention, as embodied and broadly described herein, the invention comprises a holographic spectroscope for a two-motor reflection system, including light source means for generating a light beam, first reflector means, connected to be driven by a first motor electrically connected to a first control circuit, for reflecting the light beam generated by the light source means, second reflector means, connected to be driven by a second motor electrically connected to a second control circuit, for reflecting the light beam reflected by the first reflector means, and holographic means, mounted in the optical path of the light beam from the second reflector means, for diffracting the light beam from the second reflector means. In another aspect, a balance apparatus having an elastic device can be mounted on the first motor or on the second motor to improve the variety of the scanning patterns.

It is to be understood that both the foregoing general description and the following detailed description are exemplary and explanatory only and are not restrictive of the invention, as claimed.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
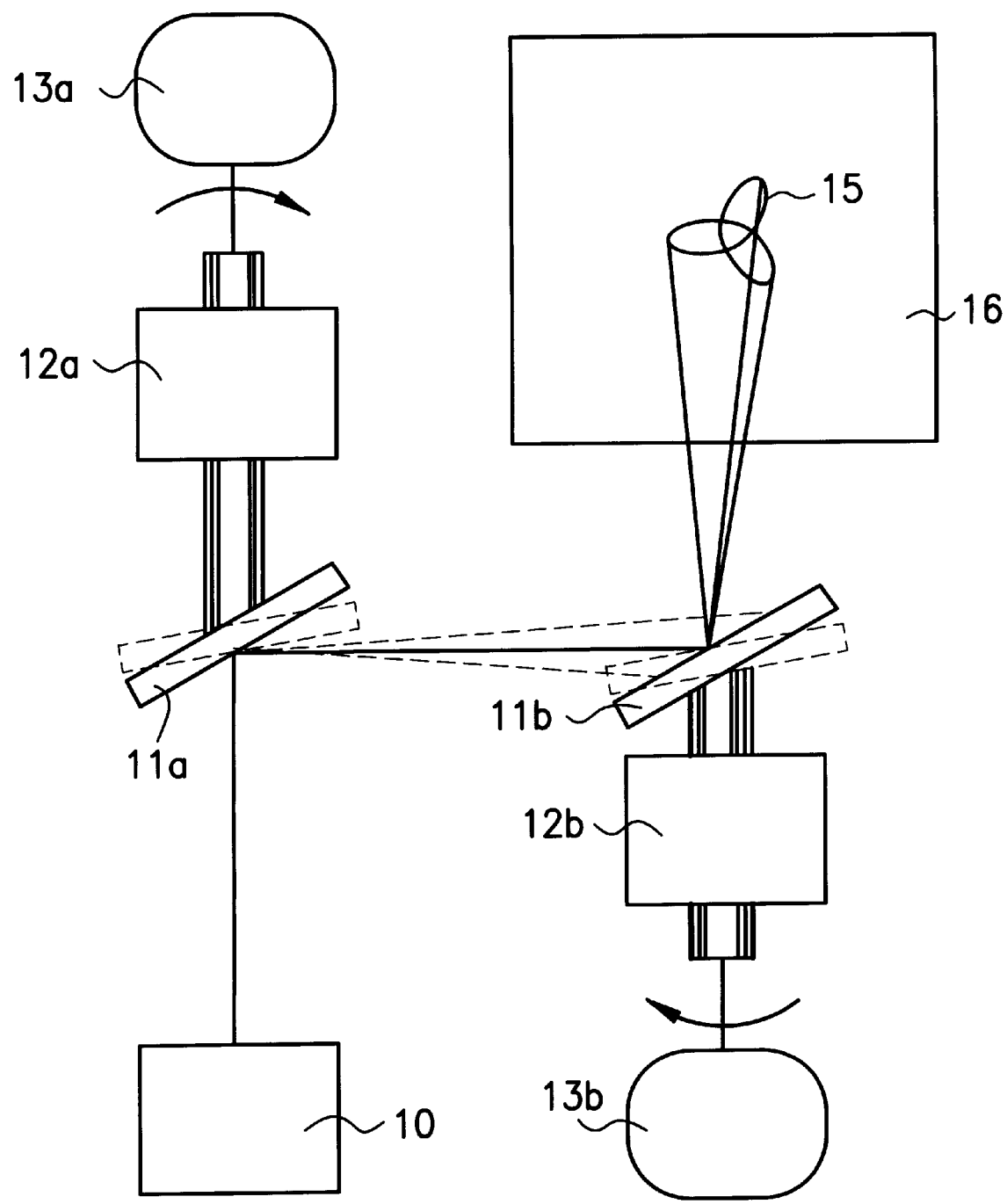
FIG. 1 is a schematic diagram of a conventional two-motor reflection system.
Figure 2:
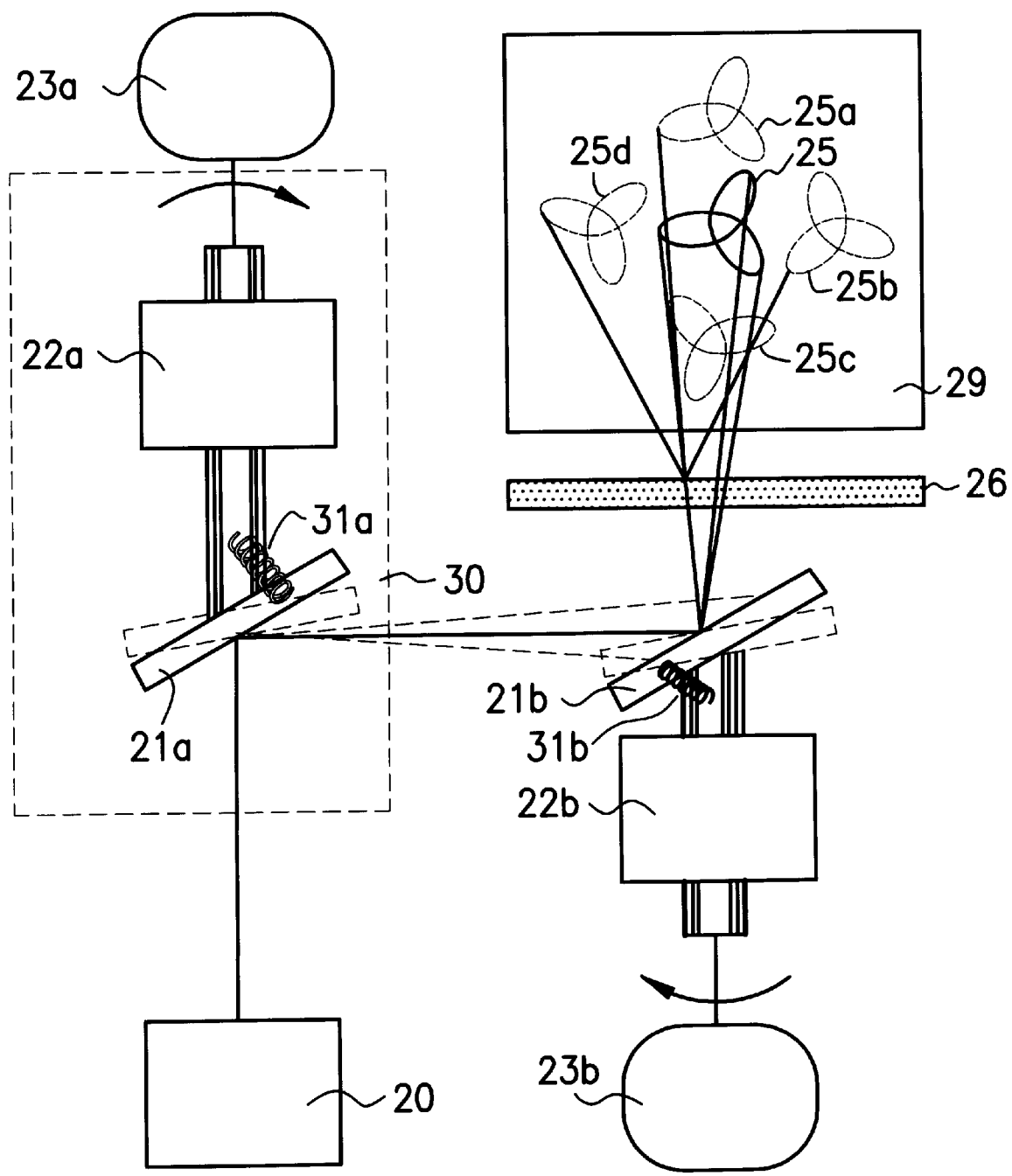
FIG. 2 is a schematic diagram of a preferred embodiment of the holographic spectroscope according to the present invention.

A holographic spectroscope of the invention is used with a two-motor reflection system as illustrated in FIG. 2. In FIG. 2, there is shown a light source 20 for generating a light beam. The light source 20 may include any kind of light source, such as for example, electric light bulbs or lasers. The light source 20 generates a light beam which is then reflected by a first reflector 21a laterally to a second reflector 21b. The first reflector 21a for reflecting the light beam generated by the light source 20 is driven by a first motor 22a which is electrically connected to a first control circuit 23a for controlling the rotating speed of the first motor 22a. The second reflector 21b reflects the light beam reflected by the first reflector 21a and is connected to be driven by a second motor 22b electrically connected to a second control circuit 23b for controlling the rotating speed of the second motor 22b.

Figure 3:
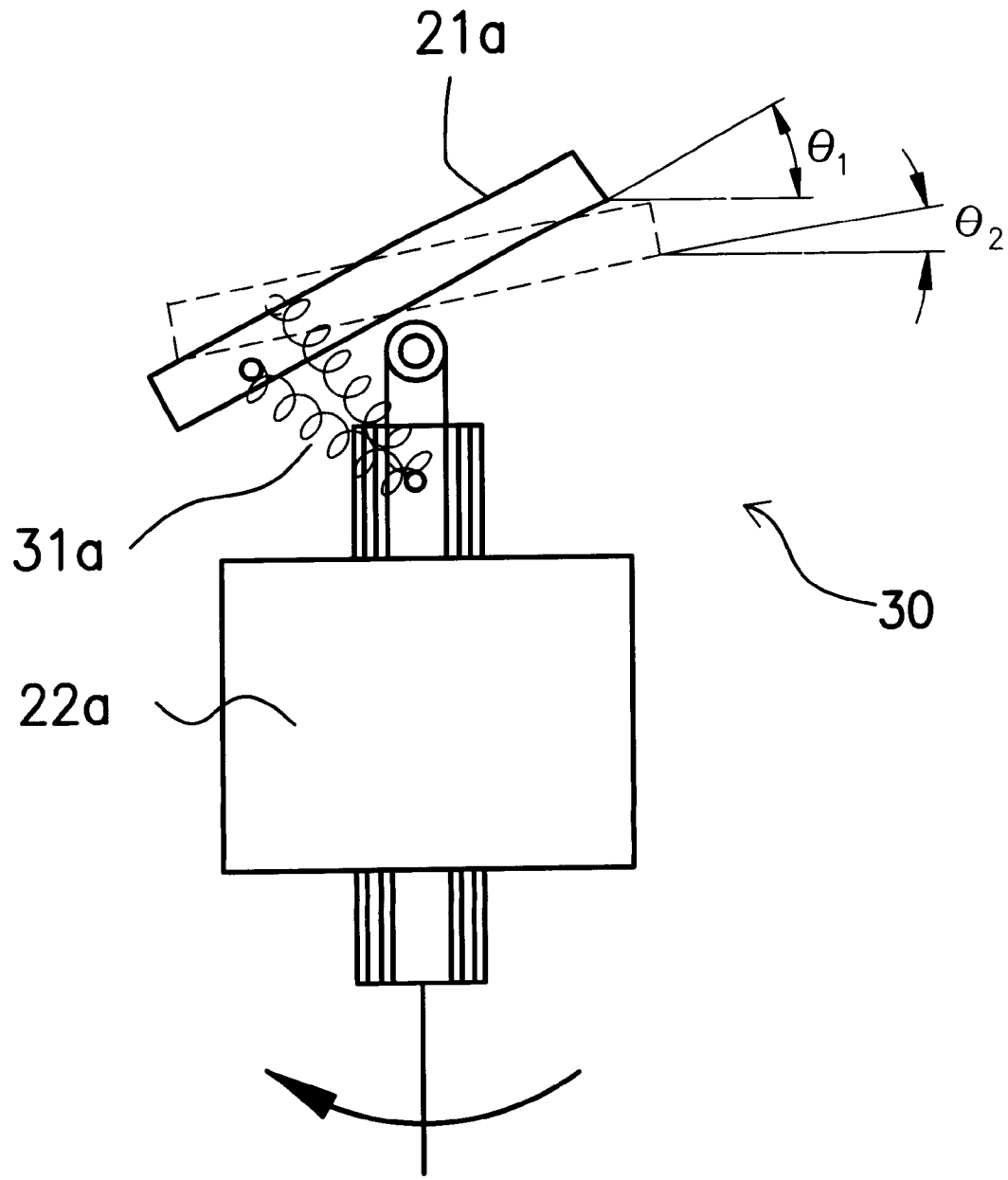
FIG. 3 is a schematic diagram of an amplified dotted line region of FIG. 2, a schematic diagram of a balance apparatus according to the present invention.

As the conventional two-motor reflection system previously described, that portion of the present invention again includes primarily the first reflector 21a, the first motor 22a, the second reflector 21b and the second motor 22b. The two-motor reflection system generates scanning patterns 25 exemplified by a lissajous curve, by changing the rotating speed of the first motor 22a or the second motor 22b and by changing the angle of the first reflector 21a or the second reflector 21b. The scanning patterns 25 are then projected on a screen 29. Also as conventional, the two-motor reflection system includes control of the rotating speed of the first motor 22a or the second motor 22b by sound. If the sound is loud enough, for example, amplified music or other rhythmic sounds, such as clapping hands, it can affect the rotating speed of the first motor 22a, or of the second motor 22b, and make the scanning patterns 25 formed by the two-motor reflection system more changeable and variable. In accordance with the present invention, a holographic spectroscope 26 and a balance apparatus 30, as illustrated in FIG. 3, is added to the two-motor reflection system, in order to improve the variety of the scanning patterns 25. The holographic spectroscope 26 for diffracting the scanning patterns 25 formed by the two-motor reflection system is mounted in the optical path of the light beam from the second reflector 21b. The holographic spectroscope 26 includes at least one hologram, for example a reflective hologram or a transmittive hologram which includes diffraction gratings and diffracts the scanning patterns 25. The holographic spectroscope 26 may be formed by many ways, for example, by imprinting plastic materials in a matrix, by ejecting plastic materials or by gilding glasses. If the light generated by light source 20 is strong enough, the holographic spectroscope 26 can generate many orders of diffraction light, for example the 0-order scanning patterns 25 and the 1st-order scanning patterns 25a to 25d, and therefore improves the extensivity of the scanning patterns 25 formed by the two-motor reflection system.

In FIG. 3, there is shown, as an enlargement of the dotted line region in FIG. 2, a schematic diagram of a balance device according to the present invention and for increasing the variety of the scanning patterns 25. As illustrated, the balance device 30 includes the first motor 22a, the first reflector 21a and an elastic device 31a mounted between the first motor 22a and the first reflector 21a. The elastic device 31a may be any kind of elastic material, or may be an extensible spring as depicted. When the first motor 22a rotates, the tension of the elastic device 31a and the eccentric force of the first reflector 21a must be balanced. If the rotating speed of the first motor 22a changes, the elastic device 31a will extend or shorten because of the tension imposed on the elastic device 31a changes and the inclination angle of the first reflector 21a changes with the elastic device 31a from angle $\theta_1$ to angle $\theta_2$, as illustrated in FIG. 3. Therefore, the changes of the inclination angle of the first reflector 21a can improve the variety of the scanning patterns 25 and diffracted scanning patterns 25a to 25d.

The present invention has the following advantages:

(1) The holographic spectroscope 26 can generate many orders of diffraction light, for example, the 0-order scanning patterns 25 and the 1st-order scanning patterns 25a to 25d, and therefore improves the extensivity of the scanning patterns 25. Furthermore, the holographic spectroscope 26 includes at least one hologram or of a larger number of holograms assembled together.

(2) The elastic device 31a of the balance device 30 can be mounted on the first motor 22a or on the second motor 22b. When the rotating speed of the first motor 22a changes, the inclination angle of the first reflector 21a changes because the tension of the elastic device 31a changes. The variety of the scanning patterns 25 and diffracted scanning patterns 25a to 25d can therefore be improved.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A two-motor reflection system with a hologram, comprising:

light source means for generating a light beam;

first reflector means, connected to be driven by a first motor electrically connected to a first control circuit, for reflecting the light beam generated by the light source means at a first angle and including first balance means for adjusting the first angle and mounted on the first motor for changing the first angle by changing the rotating speed of the first motor, the rotating speed of said first motor being controlled by sound;

second reflector means, connected to be driven by a second motor electrically connected to a second control circuit, for reflecting the light beam reflected by the first reflector means at a second angle and including second balance means for adjusting the second angle and mounted on the second motor for changing the second angle by changing the rotating speed of the second motor, the rotating speed of said second motor being controlled by sound; and holographic means, mounted in the optical path of the light beam from the second reflector means, for diffracting the light beam from the second reflector means to enhance extent and variety of scanning patterns.

2. The two-motor reflection system of claim 1, wherein said light source means comprises light bulbs.

3. The two-motor reflection system of claim 1, wherein said light source means comprises a laser.

4. The two-motor reflection system of claim 1, wherein said holographic means comprises at least one hologram.

5. The two-motor reflection system of claim 1, wherein said holographic means includes reflective holograms.

6. The two-motor reflection system of claim 1, wherein said holographic means includes transmittive holograms.

7. The two-motor reflection system of claim 1, wherein said holographic means includes imprinted plastic materials in a matrix.

8. The two-motor reflection system of claim 1, wherein said holographic means includes ejected plastic materials.

9. The two-motor reflection system of claim 1, wherein said holographic means includes gilding glasses.

10. The two-motor reflection system of claim 1, wherein the first balance means includes an elastic device connected between the first motor and the first reflector means.

11. The two-motor reflection system of claim 10, wherein the elastic device includes springs.

12. The two-motor reflection system of claim 1, wherein the second balance means includes an elastic device connected between the second motor and the second reflector means.

13. The two-motor reflection system of claim 12, wherein the elastic device includes springs.

14. A two-motor reflection system with a hologram, comprising:

light source means for generating a light beam;

first reflector means, connected to be driven by a first motor electrically connected to a first control circuit to control rotating speed of said first motor by sound, for reflecting the light beam generated by the light source means at a first angle, the first reflector means having a first balance means for changing the first angle by changing the rotating speed of the first motor to enhance extent and variety of scanning patterns;

second reflector means, connected to be driven by a second motor electrically connected to a second control circuit to control rotating speed of said second motor by sound, for reflecting the light beam reflected by the first reflector means at a second angle, the second reflector means having a second balance means for changing the second angle by changing the rotating speed of the second motor, also to enhance extent and variety of scanning patterns; and holographic means, mounted in the optical path of the light beam from the second reflector means, for diffracting the light beam from the second reflector means to further enhance extent and variety of scanning patterns.

* * * * *